United States Patent [19]

Matsuoka et al.

[11] Patent Number: 5,139,567
[45] Date of Patent: Aug. 18, 1992

[54] PROCESS FOR RECOVERING VALUABLE METALS FROM A DUST CONTAINING ZINC

[75] Inventors: Toshio Matsuoka; Yukio Koyabu; Shinichi Kurozu, all of Niihama, Japan

[73] Assignee: Sumitomo Heavy Industries, Ltd., Tokyo, Japan

[21] Appl. No.: 683,158

[22] Filed: Apr. 10, 1991

[30] Foreign Application Priority Data

Apr. 20, 1990 [JP] Japan .................. 2-102902

[51] Int. Cl.$^5$ .............................................. C22B 7/02
[52] U.S. Cl. ...................... 75/500; 75/10.15; 75/10.31; 75/665; 75/695; 75/746
[58] Field of Search ............ 75/10.15, 10.31, 500, 75/665, 695, 746

[56] References Cited

U.S. PATENT DOCUMENTS 4,612,041 9/1986 Matsuoka et al. .
4,673,431 6/1987 Bricmont .............................. 75/695

FOREIGN PATENT DOCUMENTS 0174641 3/1986 European Pat. Off. .
0285458 10/1988 European Pat. Off. .
1508054 10/1969 Fed. Rep. of Germany .

Primary Examiner—Melvyn J. Andrews
Attorney, Agent, or Firm—Armstrong, Nikaido, Marmelstein, Kubovcik & Murray

[57] ABSTRACT

There is disclosed a process for recovering valuable metals from a dust containing zinc comprising mixing the dust containing zinc with a reductant and a flux for regulating the basicity of slag, forming the mixture into pellets with a pelletizer, charging the pellets into a shaft type preheating-prereducing furnace provided with a preheating zone at the upper part and with a reducing zone at the lower part and removing, in the preheating zone, moisture and ignition loss components in the pellets, while prereducing in the reducing zone, the pellets under such conditions that a reduction of iron oxide is made to proceed selectively while the reduction of zinc oxide is suppressed to the possible minimum, charging the prereduced pellets into a melting furnace to melt and reduce them in the furnace, separating zinc, or zinc and lead, by evaporation followed by condensation to recover them, and separating iron and lead, or iron, according to the difference in their specific gravities to recover the iron as a molten pig iron and the lead as a crude lead.

5 Claims, 3 Drawing Sheets

PROCESS FOR RECOVERING VALUABLE METALS FROM A DUST CONTAINING ZINC

BACKGROUND OF THE INVENTION

The present invention relates to a process for recovering valuable metals such as zinc, iron and the like from a dust having a higher content of zinc, such as the one generated in an electric arc furnace for steel manufacture or the like.

A dust generated in an iron and/or steel melting furnace, such as the electric arc one, is thus far collected by means of a dust collector. The amount of the dust generated normally corresponds to 1 to 1.5% by weight of the crude steel manufactured, and the dust contains large amounts of valuable metals, namely 25 to 30% by weight of iron, 20 to 25% by weight of zinc and 3 to 4% by weight of lead. The present situation is, however, such that the dust is to be subjected to a collective treatment by specific refiners to whom the dust generated is handed over, due to unavailability of a proper and easy recovering method of the valuable metals which can be operated on a simple and small scale.

Several methods have been proposed as the recovering method, including a rotary kiln method and also recently, a treating method using plasma heat.

The former method aims mainly at separating zinc from other materials in the dust and comprises reducing the zinc and iron oxide in the dust by means of a rotary kiln and separating the resulting metals. This method, however, has the drawbacks of the complexity of process and a high energy consumption; that is, since the free board atmosphere in the rotary kiln is highly oxidizing, the zinc vapor once reduced and separated is reoxidized in the free board of the rotary kiln, so that it must be further processed in a zinc smelting furnace, electrowinning or the like, to be recovered as metallic zinc. Further, the reduction product of the iron component thus obtained is a sponge iron containing a large amount of gangue minerals, so that it cannot be recovered and used as is as useful resources and hence has not yet been recovered as metallic iron.

In the latter method, since a large amount of energy is consumed for plasma generation, and the zinc and iron recovered are of relatively low value considering the energy consumed, no satisfactory result has been obtained which justifies the cost of treatment.

Moreover, another problem involved in the method is that the excessively high temperature used in the method causes the vaporization of undesirable metals, e.g., copper and resultant contamination of the zinc product.

The present invention has been achieved in view of such circumstances. The object of the invention is to provide a process for recovering valuable metals from an iron dust containing zinc easily and with a low energy consumption for treatment.

SUMMARY OF THE INVENTION

The process for recovering valuable metals from a dust containing zinc according to this invention comprises mixing the dust containing zinc with a reductant (such as coal- or petroleum-base coke) and a flux (such as lime stone) for adjusting the basicity of slag, forming the mixture into large-sized pellets having a particle diameter not less than 16 mm with a pelletizer, charging the pellets into a shaft type furnace provided with a preheating zone at the upper part and with a reducing zone at the lower part and removing, in the upper preheating zone, moisture and ignition loss components in the pellets by utilizing the exhaust CO gas from the later-stage melting furnace while prereducing, in the reducing zone, the pellets under such conditions of $CO_2/CO$ gas ratio and gas temperature that the reduction of iron oxide is made to proceed selectively while the reduction of zinc oxide is suppressed to the possible minimum, then charging the prereduced pellets into a melting furnace to melt and reduce them in the furnace, separating zinc, or zinc and lead, by evaporation followed by condensation to recover them, and separating iron and some lead, or iron alone, by means of the difference in their specific gravities to recover the iron as a molten pig iron and the lead as a crude lead. Thus, the valuable metals can be recovered easily with a low energy consumption.

DESCRIPTION OF THE PREFERRED EMBODIMENTS

Figure 1:
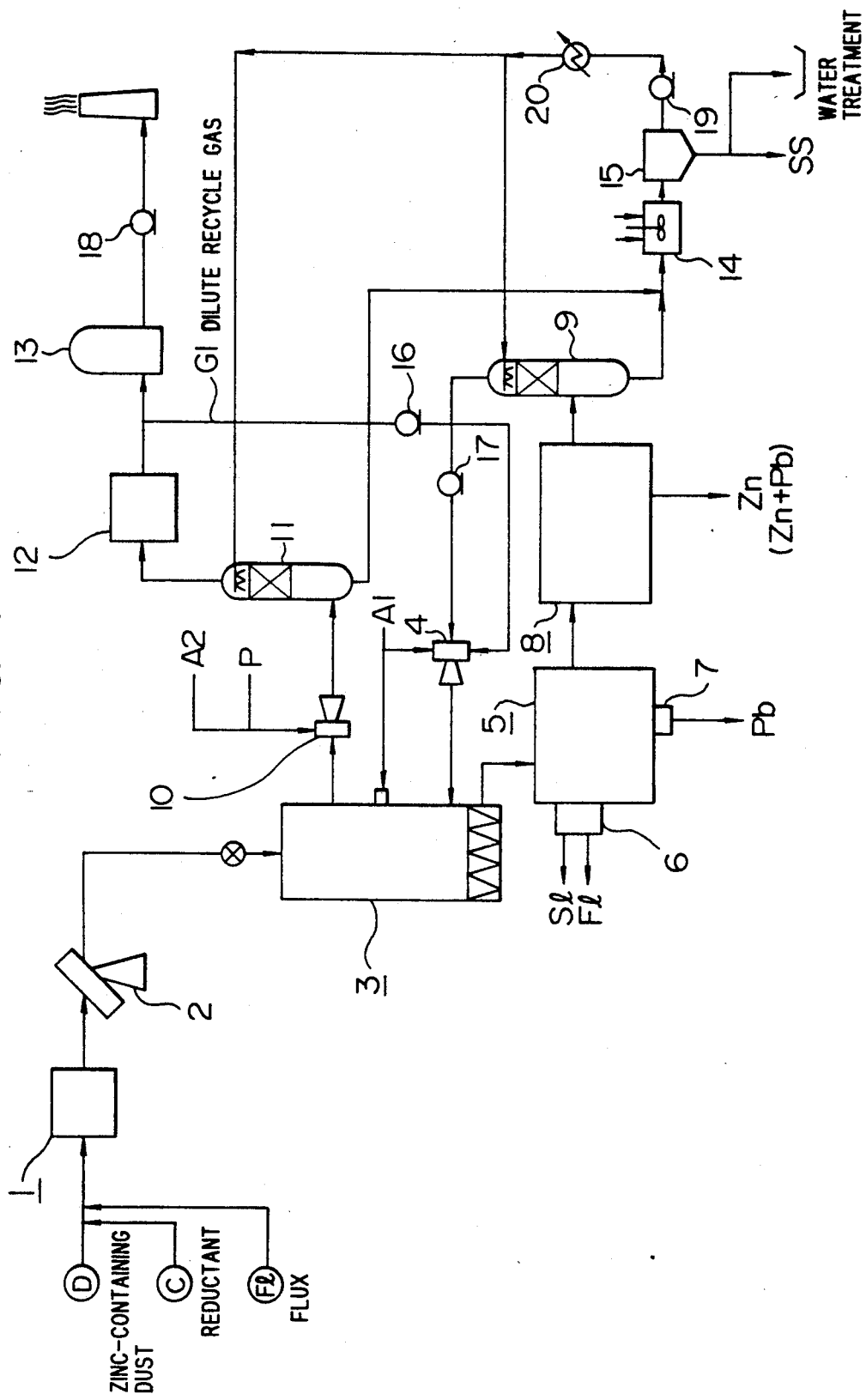
FIG. 1 is a flow chart of apparatuses one embodiment of the process for recovering valuable metals according to this invention.

This invention will be elucidated below with reference to the embodiment shown in the drawings (FIG. 1).

A dust D having a high zinc content, coke C as a reductant, and lime stone or dolomite as flux F1 are charged and mixed in a blender 1 and then formed into pellets 16 mm or more in diameter with a pelletizer 2. The pellets thus formed are charged into a preheating-prereducing furnace 3 of shaft type. In the preheating zone of the upper part of the preheating-prereducing furnace 3, the pellets are dried by the hot gas introduced from the lower part of the furnace and $CO-CO_2$ gas generated at the prereducing zone, or by said gases further diluted with air introduced from midway of the preheating-prereducing furnace.

The dried pellets are preheated, while further descending through the shaft furnace, by the gas ascending from the prereducing zone. In the preheating zone, there are removed the ignition loss components in the pellets, including $CO_2$ evolved by the decomposition of lime stone and/or dolomite, etc. used as the flux F and substances which are generated by the decomposition etc. of carbonates and the like contained in the dust D.

The pellets thus preheated go down to the reducing zone of the lower part of the preheating-prereducing furnace 3, i.e., the prereducing zone of the furnace 3, and the iron oxide therein is reduced to an extent which corresponds to the atmosphere formed by interaction between the reducing gas adjusted in the gas temperature-composition regulating furnace 4 and the coke added beforehand as a reductant at the time of pelletizing the dust D.

Figure 2A:
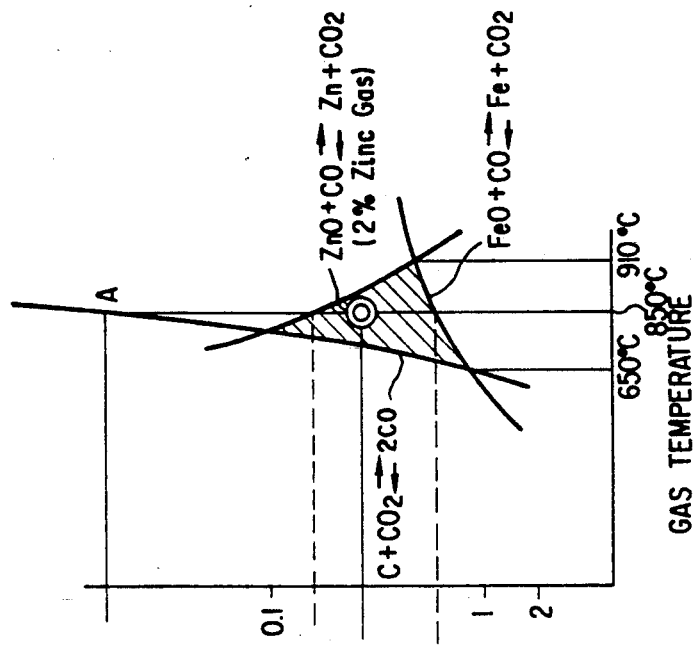
FIG. 2(a) is a diagram showing the effect of temperature and $CO_2/CO$ ratio on the equilibria of $ZnO + CO \rightleftarrows Zn + CO_2$, $FeO + CO \rightleftarrows Fe + CO_2$ and $CO_2 + C \rightleftarrows 2CO$.
Figure 2B:
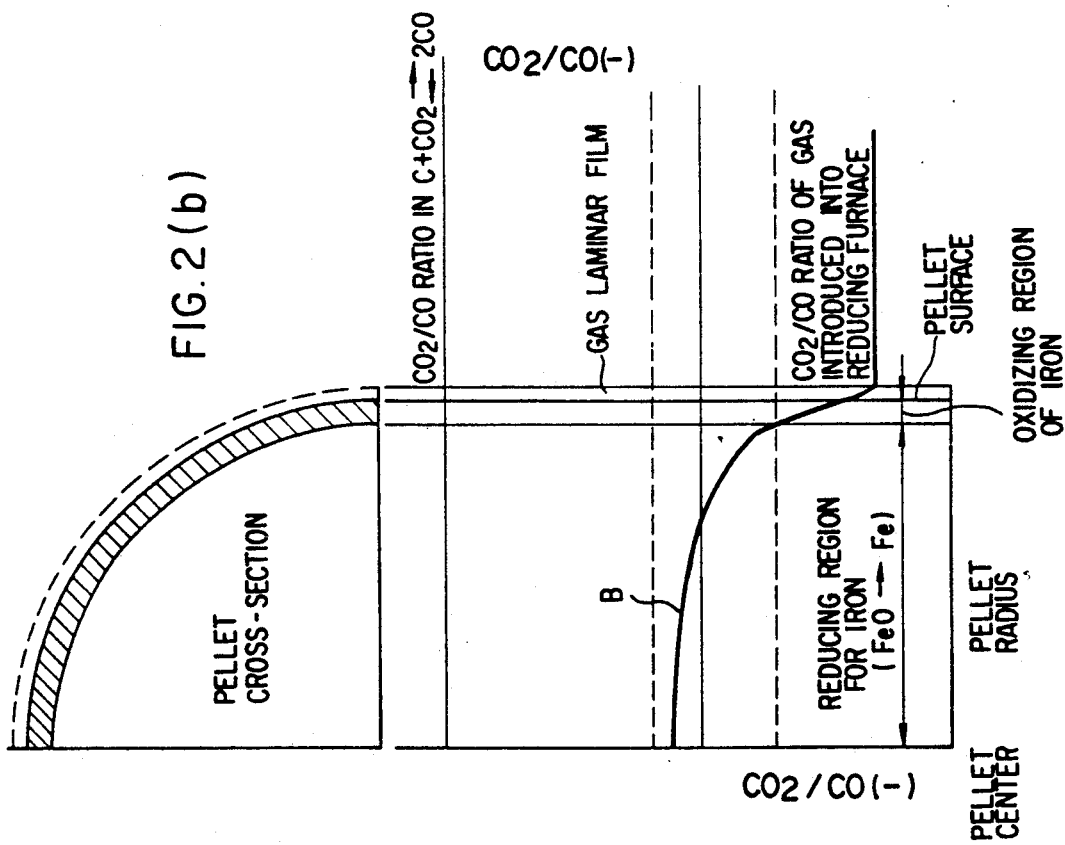
FIG. 2(b) is a diagram showing the conditions of the gas inside and outside the pellet.

That is, the conditions of the gas introduced into the reducing zone of the furnace should be controlled such that, as shown in FIG. 2(a), the conditions of the gas inside the pellets are regulated within the range surrounded by the equilibrium curves of $FeO+CO = Fe+CO_2$ and $C+CO_2=2CO$ for the selective reduction of iron oxide and the equilibrium curve of $ZnO+CO=Zn+CO_2$ which corresponds to the pressure of vaporized zinc at 0.02 atmospheric pressure, for example, to control the reduction of zinc oxide practically at zero level, i.e., a range shown by hatching in the Figure.

Accordingly, the temperature of the pellets for satisfying the above conditions is in the range of 650–910° C., preferably 850° C., and the gas temperature-composition regulating furnace is controlled so as to give such a temperature and atmosphere of the pellets. When the temperature inside the pellet is maintained at 850° C. as in this example, the $CO_2/CO$ ratio in the pellet has an equilibrium value as shown by the point A in FIG. 2(a), but it is influenced by the diffusion of the gas introduced from the gas temperature-composition regulating furnace. That is, even when the $CO_2/CO$ ratio of the introduced gas is substantially higher than the ratio preferable for the atmosphere in the pellet, as in the example shown in the Figure, the atmosphere inside the pellet assumes the value as shown by the curve B under the influences of the gas film resistance at the pellet surface and the diffusion resistance in the pore inside the pellet.

That is, when the composition of the gas introduced into the reducing furnace is adjusted so that the gas conditions inside the pellet may be kept in the range shown by hatching in FIG. 2(a), the layer of the pellet near to its surface, under the influence of the composition of the gas introduced into the reducing furnace, becomes a region where the oxidation of iron proceeds; on the other hand, in the inner part of the pellet, with said region as the boundary, iron oxides are reduced by the reductant coke added at the time of pelletizing, while the reduction of zinc oxides is suppressed.

Since the layer of the pellet near to the surface is a strongly oxidizing region for zinc as described above, the zinc vapor formed by the reducing reaction taking place inside the pellet (corresponding, for example, to 2% zinc vapor in the present example), in the course of diffusing from the inside to the outside, is oxidized in said oxidizing region and captured in the pellet as zinc oxide. As a result, an effect of the suppression of the zinc loss from the pellet is also obtained of reducing the zinc removal rate of the pellet.

Figure 4:
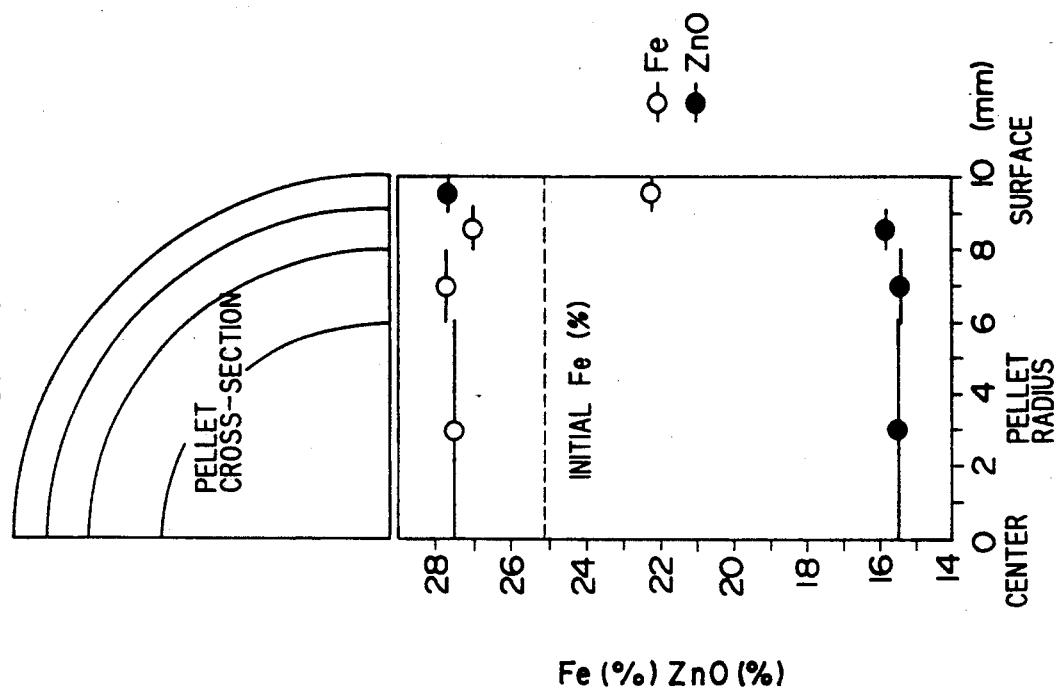
FIG. 4 is a diagram showing the contents of iron and zinc inside the pellet (in the radial direction).

This effect is clearly demonstrated by the results of experiments shown in FIG. 4.

The prereduced pellets are charged into a melting furnace, such as a low frequency induction furnace 5, where iron oxide, zinc oxide and lead oxide are reduced and molten and the remaining metal oxides are mostly formed into slag S1. The reduced iron is discharged as a molten pig iron Fe (containing about 4% of carbon) and the slag S1 as a molten slag, continuously from the low frequency induction furnace 5 via a settling furnace 6.

On the other hand, a part or the major part of the reduced lead Pb is separated in the induction furnace by means of the difference of the specific gravity from molten iron, and stored in a trap pot 7, from which lead is periodically taken out as crude one.

A part of lead and the major part of the reduced zinc and lead is vaporized due to their relatively lower boiling point, led to a condenser 8 together with the reducing gas CO, condensed, cooled, and recovered as condensed zinc and lead. The reducing gas CO which has passed through the condenser 8 is sent to the gas temperature-composition regulating furnace 4 via a scrubber 9. In the regulating furnace 4, the reducing gas CO is partially burnt with the combustion air A1 and mixed with a dilute recycle gas G1 to meet the aforementioned conditions of gas for selective prereduction of iron oxide.

The exhaust gas from the preheating-prereducing furnace 3 is led to a gas incinerator 10 to burn the combustible components completely, then sent to a scrubber 11 to be washed and cooled, and exhausted through a mist eliminator 12 and a dust collector 13 out of the system.

The washing water from the scrubbers 9 and 11 is led to a pH regulating tank 14 for pH adjustment and then sent to a settling tank 15 to precipitate solid matters, which are withdrawn as a sludge SS and returned to the preheating-prereducing furnace 3 by means of mixing with dust I and pelletizing. A part of the water thus cleaned is recycled as the washing water for the scrubbers 9 and 11 and the remainder of the water is discharged out of the system via water treatment equipment.

Numerals 16, 17 and 18 each indicate a blower, 19 a pump and 20 a heat exchanger.

EXPERIMENTAL EXAMPLE

Green pellets having the composition shown in Table 1 were charged into the preheating-prereducing furnace (shaft furnace) 3 at a rate of 100 kg/hr and treated therein under conditions of the temperature of the gas introduced to the furnace 3 of 850° C. and the $CO_2/CO$ ratio of the introduced gas of 2. Then the samples of the pellets were collected from the bottom of the reducing furnace 3.

TABLE 1

| | $Fe_2O_3$ | ZnO | C | Cd | Pb | Na | K | Cl | CaO | $SiO_2$ | MgO | $Al_2O_3$ |
|---|---|---|---|---|---|---|---|---|---|---|---|---|
| Wt % | 35.90 | 18.73 | 13.69 | 0.06 | 3.71 | 1.17 | 1.58 | 1.53 | 6.57 | 4.63 | 0.84 | 0.94 |

Figure 3:
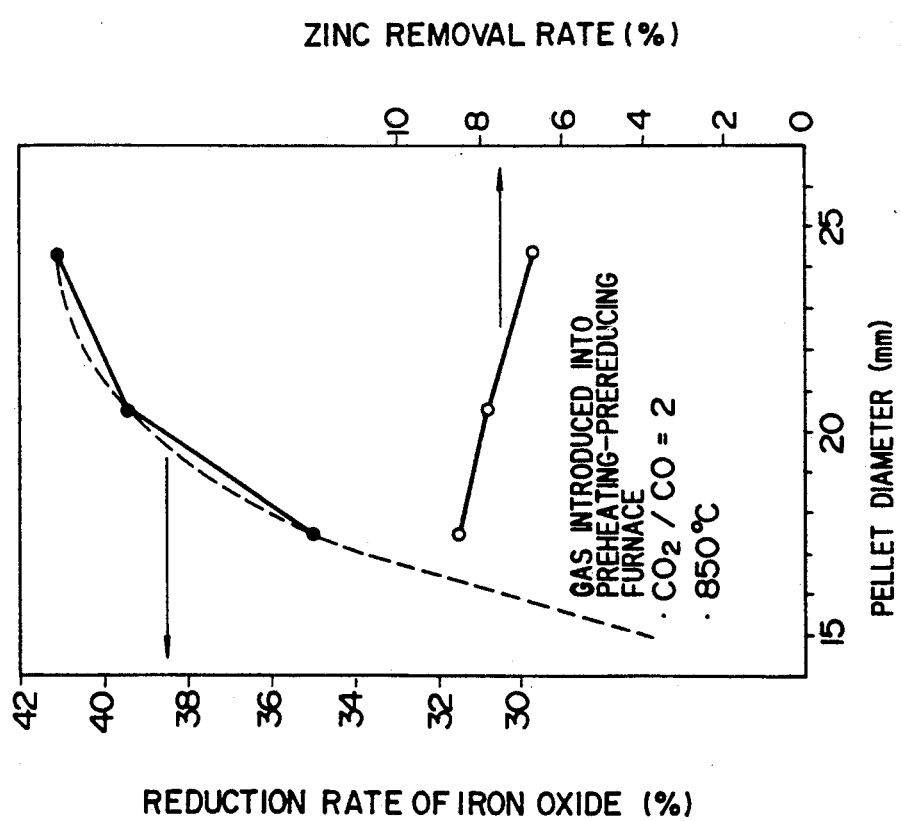
FIG. 3 is a diagram showing the relation of the zinc removal rate and the iron oxide reduction rate with the pellet diameter.

Analysis was made of the compositions of the pellets thus sampled and classified according to the pellet diameter. Resultingly, it was found that, as shown in FIG. 3, pellets of diameters of 17 mm, 20 mm and 25 mm showed a zinc removal rate of 8.5%, 8.0% and 6.8%, respectively, and a reduction rate of iron oxide of 35%, 39% and 41%, respectively; thus the larger the pellet diameter was, the more suppressed was the zinc loss and the more improved was the iron oxide reduction rate.

Although the larger the particle diameter of the pellets, the more preferable as described above, the particle size of pellets which can be commercially produced with conventional pelletizer is about 50 mm at the most, and pellets of still larger size are difficult to obtain.

The pellet of a particle diameter of 20 mm mentioned above was analyzed for its internal composition. The analysis was made with the respective portions of the pellet divided into 4 portions of equal weight from the surface layer toward the center of the pellet. It was found that, as shown in FIG. 4, in the close proximity of the surface the pellet contained 28% of zinc and 22% of iron, revealing that the reduction of iron had not proceeded near the surface and zinc had been concentrated to the surface.

This is presumably because an oxidizing region is formed in the surface part of the pellet by the interdilution between the gas introduced from the outside and the gas coming out from the inside of the pellet and, though a zinc gas corresponding to 2% zinc vapor diffuses from the inside toward the outside of the pellet, it is captured then in the oxidizing region.

On the other hand, in a region ranging from about 1 mm below the surface to the center of the pellet the zinc content and the iron content were found to be approximately constant, respectively, the zinc content being about 15.5% and the iron content being about 27.5%. Thus, in this region the reduction of zinc is suppressed and the reduction of iron is promoted. When examined with individual pellets of different sizes, the larger the particle diameter, the larger the above-mentioned effect.

The above results reveal that by making the diameter of the pellets not less that 16 mm, the reduction of zinc can be suppressed and the reduction of iron can be promoted, the energy required in melting and reduction in the later-stage melting furnace 5 can be reduced, and the evaporation loss of zinc in the preheating-prereducing furnace 3 can be prevented and resultingly the recovery efficiency in the later-stage zinc condenser 8 can be improved, as compared with the case of prior pellets having a diameter of 15 mm or less.

EFFECT OF THE INVENTION

As set forth above, according to this invention, an iron dust with a high concentration of zinc produced in steel manufacture is mixed with a reductant (typically coke) and a flux F1, formed into a large-sized pellets with diameter of 16 mm or more with a pelletizer, then the pellets are subjected in a preheating-prereducing furnace to the removal of the moisture and the ignition loss components and to the preliminary reduction of iron oxide contained therein, thereafter subjected to melting and reduction in a melting furnace, then zinc, or zinc and the major part of lead, are separated by evaporation to recover them as condensed zinc and lead, and iron and a part of lead are separated according to the difference of the respective specific gravities to recover the iron as a molten pig iron and the lead as a crude lead. Accordingly, this invention exerts the following effects:

(1) Since the iron oxide is prereduced in a preheating-prereducing furnace prior to its charge into the melting furnace, the reduction rate of the iron oxide charged into the melting furnace is improved and the electric power consumption for the reduction of iron oxide can be reduced.

(2) The large-size pellets having a pellet size of 16 mm or more and containing a reductant (typically coke) therein of this invention show a lower reduction rate as compared with iron-containing pellets of conventional size, but they make it possible to maintain a reductive atmosphere inside the pellets more easily as compared with those of smaller sizes and to form gas conditions such that the reduction of ZnO is suppressed to the minimum while the reduction of iron oxide is promoted to the utmost.

(3) If the conditions for the gas to be charged to the furnace are set up such that the atmosphere inside the pellet is regulated within a range surrounded by the equilibrium curve of $ZnO+CO=Zn+CO_2$ corresponding to the partial pressure of Zn (for example, a zinc vapor partial pressure of 0.02 atm) and those of $FeO+CO=Fe+CO_2$ and $C+CO_2=2CO$, the concentration of zinc in the gas leaving the prereducing zone of the furnace can be expected to be practically zero because, at the upper part of the furnace, the partial pressure of CO in the gas ascending in the interior of the furnace while reacting therein would be lowered to a considerable extent and the temperature of the gas will be lowered, compared to the partial pressure of CO and temperature of the gas at the spot near to the bottom of the preheating-prereducing furnace where the partial pressure of CO is the highest.

Further, as described in the Example, an effect can also be expected wherein the zinc which has been reduced and vaporized in the inner part of the pellet is again captured as the oxide (i.e., solid) in the strongly zinc-oxidizing region near the surface.

(4) Valuable metals as zinc and lead can be easily recovered; because the melting furnace is suitable for melting and reducing the pellets and vaporizing zinc since the furnace has a high stirring power and it can be simply constructed so as to keep its body gastight.

(5) Bursting rarely occurs when the pellets are charged into molten iron in the furnace, because the ignition loss components have been removed in advance. Thus, the operation with a stable molten iron can be achieved and the generation of dust can also be reduced.

(6) By adopting a temperature of the shaft furnace bottom of 650-910° C., preferably 850° C. which is higher than the decomposition temperature of lime stone or dolomite, it becomes possible to use an inexpensive material as lime stone and the like as the flux to be added beforehand to the pellets for slag regulation.

(7) If the reduction of charged materials is conducted in the melting furnace alone, an excess of reducing gas will be generated, which may be difficult to be utilized effectively unless the plant site location is suitable for such utilization. In this invention, by adopting the prereduction and further the preheating of the pellets by gas which has been used for prereduction, the energy possessed by the gas can be utilized effectively and the energy consumption of the process as a whole can be reduced.

What is claimed is:

1. Process for recovering valuable metals, including iron, lead, and zinc, from dust including oxides of the valuable metals and moisture, comprising the steps of:
    a) mixing the dust with a reductant and a flux for regulating the basicity of a slag;
    b) forming the mixture into pellets;
    c) charging the pellets into a vertical shaft furnace;
    d) preheating the pellets in an upper portion of the shaft furnace, thereby removing moisture and ignition loss components from the pellets;
    e) prereducing the pellets in a lower portion of the shaft furnace under conditions for selectively reducing iron oxide while minimizing the reduction of zinc oxide, thereby emitting gaseous reduction loss components;
    f) charging the prereduced pellets into a furnace for melting and further reducing the prereduced pellets in the melt;

g) separating zinc, or zinc and lead, by evaporation followed by condensation, whereby zinc, or zinc and lead, are recovered in a condenser;

h) separating iron and lead by a specific gravity difference technique, thereby recovering the iron as molten pig iron and the lead as crude lead.

2. A process for recovering valuable metals from dust, as defined in claim 1, wherein step (b) includes forming the mixture into pellets having a diameter not less than 16 mm.

3. A process for recovering valuable metals from dust, as defined in claim 1, wherein the step (e) conditions for selectively reducing iron oxide while minimizing the reduction of zinc oxide include selecting a temperature and a $CO/CO_2$ atmosphere; the step (a) reductant is a carbonaceous reductant; and the amount of reductant in step (a) and the temperature and amount of $CO/CO_2$ om step (e) are selected so that the $CO/CO_2$ ratio in the pellets in step (e) is within a area on a $CO/CO_2$ versus temperature plot defined by the equilibria curves $FeO+CO\rightleftharpoons Fe+CO_2$, $C+C_2\rightleftharpoons 2CO$, and $ZnO+CO\rightleftharpoons Zn+CO_2$.

4. A process for recovering valuable metals from dust, as defined in claim 3, wherein the temperatures within the pellets in step (e) is between 650° and 910° C.

5. A process for recovering valuable metals from dust, as defined in claim 3, wherein the temperatures within the pellets in step (e) is 850° C.

* * * * *